(12) United States Patent
Zhu et al.

(10) Patent No.: US 6,945,229 B1
(45) Date of Patent: Sep. 20, 2005

(54) SYSTEM FOR ENGINE KNOCK CONTROL

(75) Inventors: Guoming G. Zhu, Novi, MI (US); Ibrahim Haskara, Westland, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/930,424

(22) Filed: Aug. 31, 2004

(51) Int. Cl.$^7$ ................................................ F02P 5/00
(52) U.S. Cl. ............................ 123/406.21; 123/406.37
(58) Field of Search ................... 123/406.21, 406.29, 123/406.34, 406.35, 406.37, 406.38; 73/117.3

(56) References Cited

U.S. PATENT DOCUMENTS

| | | | |
|---|---|---|---|
| 4,002,155 | A | 1/1977 | Harned et al. |
| 4,012,942 | A | 3/1977 | Harned |
| 4,061,116 | A | 12/1977 | Saida et al. |
| 4,312,214 | A | 1/1982 | Kramer et al. |
| 4,422,422 | A | 12/1983 | Mowery et al. |
| 4,993,387 | A | 2/1991 | Sakakibara et al. |
| 5,040,519 | A | 8/1991 | Krebs et al. |
| 5,134,980 | A | 8/1992 | Sakakibara et al. |
| 5,215,058 | A | 6/1993 | Sakakibara et al. |
| 5,269,178 | A | 12/1993 | Vigmostad et al. |
| 5,386,722 | A | 2/1995 | Meyer et al. |
| 5,652,380 | A | 7/1997 | Machida |
| 5,803,047 | A | 9/1998 | Rask |
| 5,896,842 | A * | 4/1999 | Abusamra ............... 123/406.39 |
| 5,979,406 | A * | 11/1999 | Aoki et al. ............. 123/406.37 |
| 5,992,386 | A | 11/1999 | Nytomt et al. |
| 6,012,426 | A | 1/2000 | Blommer |
| 6,234,146 | B1 * | 5/2001 | Tanaya et al. ......... 123/406.37 |
| 6,354,264 | B1 | 3/2002 | Iwakiri et al. |
| 6,427,662 | B2 * | 8/2002 | Tanaya et al. ......... 123/406.29 |
| 6,505,606 | B2 * | 1/2003 | Lodise et al. .......... 123/406.21 |
| 6,722,343 | B2 * | 4/2004 | Uchida et al. ......... 123/406.33 |
| 2003/0172907 | A1 | 9/2003 | Nytomt et al. |
| 2003/0183195 | A1 | 10/2003 | Uchida et al. |
| 2004/0074476 | A1 | 4/2004 | Uchida et al. |
| 2004/0084019 | A1 * | 5/2004 | Zhu et al. .............. 123/406.21 |
| 2004/0088102 | A1 | 5/2004 | Daniels et al. |
| 2004/0103860 | A1 | 6/2004 | zur Loye et al. |

OTHER PUBLICATIONS

Engine Control Using Combustion Model; Y. Ohyama, International Journal of Automotive Technology, vol. 2, No. 2, pp. 53-62 (2001).

* cited by examiner

*Primary Examiner*—Mahmoud Gimie
(74) *Attorney, Agent, or Firm*—Brinks Hofer Gilson & Lione

(57) ABSTRACT

The present invention provides a system for controlling knock in an engine having one or more cylinders in which combustion occurs. The system includes a sensor that detects the ionization of the combustion process in the cylinders. The ionization is related to the knock intensity occurring in the cylinders, and the sensor further transmits a signal associated with the knock intensity. The system further includes a controller that monitors the stochastic behavior of the ionization signal and adjusts the ignition timing of the engine to operate the engine with an actual knock intensity that is below a knock borderline limit that defines a desired knock intensity.

16 Claims, 4 Drawing Sheets

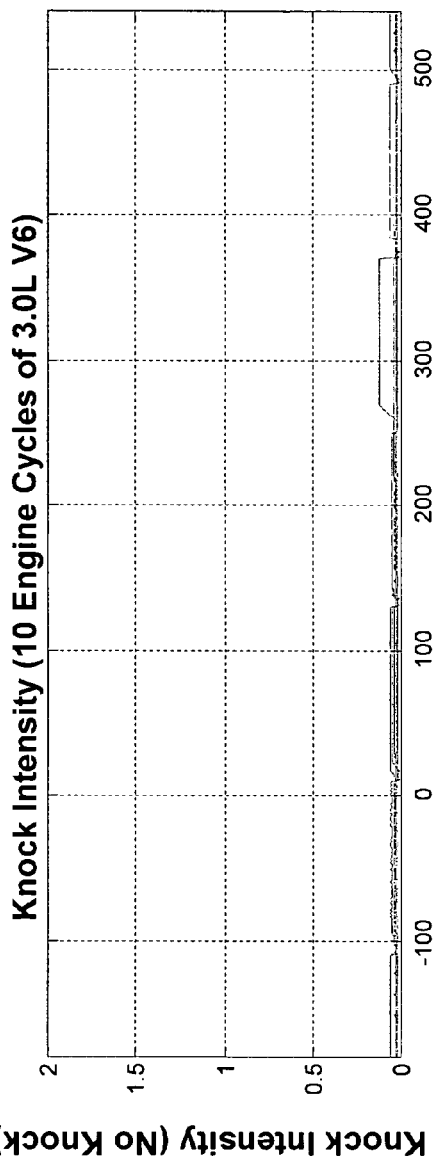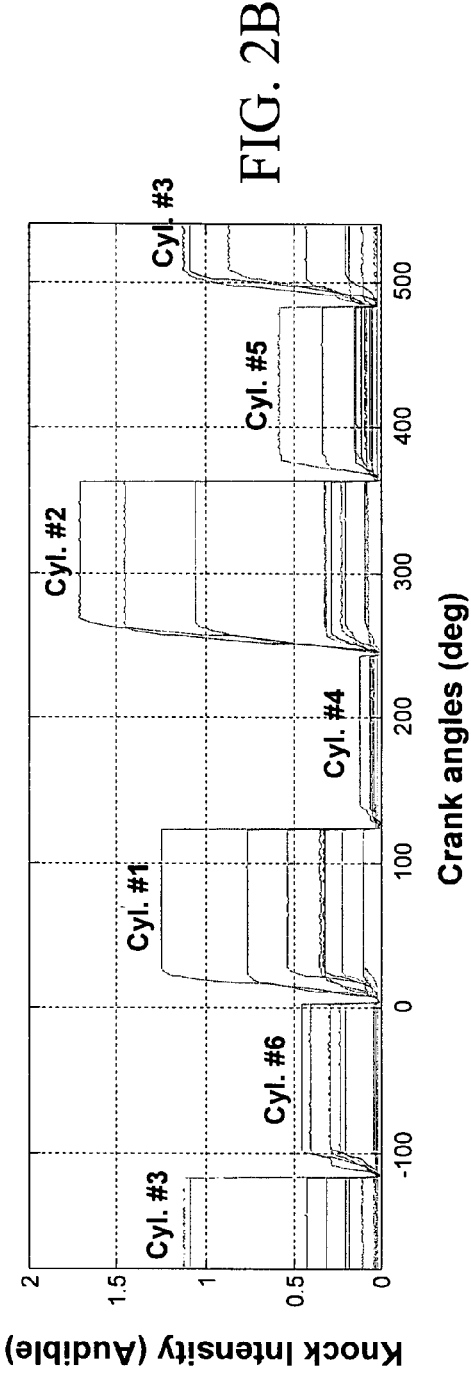
FIG. 2A
FIG. 2B

SYSTEM FOR ENGINE KNOCK CONTROL

BACKGROUND

The present invention generally relates to a system for engine knock control.

Internal combustion engines are designed to maximize power while meeting exhaust emission requirements and minimizing fuel consumption. This objective, however, is often limited by engine knock for a given air-to-fuel ratio. Therefore, it is desirable to be able to detect engine knock such that the engine can operate at its knock limit to provide maximum power and fuel economy. Some engines employ accelerometers to detect engine knock. Because of the low signal-to-noise ratio of conventional accelerometer based knock sensors, a dual-rate count-up and count-down scheme is commonly used for engine knock limit control. These approaches are based upon use of a single knock flag obtained by comparing the knock intensity signal of a knock sensor to a given threshold. The knock intensity signal is defined as the integrated value, over a given knock window, of the absolute value of the signal obtained by filtering the raw knock sensor signal using a band-pass filter. This scheme continually takes the engine in and out of knock, rather than operating the engine at near its knock limit. Moreover, at certain operating conditions, the effectiveness of these schemes may be compromised by engine mechanical noises produced by valve closures and piston slap and picked up by the accelerometers, which may lead to conservative ignition timing and consequent reduced engine performance.

The use of a high quality in-cylinder ionization signal makes it possible to control engine knock using knock intensity derived from ionization signal directly for each cylinder due to the increased signal to noise ratio of ionization versus accelerometer based systems. The cycle-to-cycle variation in the combustion process results in an ionization knock intensity signal that is similar to a random process when the engine is operated at knock conditions. This makes it almost impossible to use a deterministic limit controller to find true knock borderline ignition timing and operate the engine at this corresponding timing. Study shows that the ionization knock intensity feedback signal has great knock controllability. This invention proposes a system and stochastic approach for engine knock control utilizing the mean and standard deviation information of the ionization knock intensity signal as well as the evolution of its stochastic distribution. The proposed stochastic knock limit controller is able to not only seek and find engine knock borderline ignition timing but also operate the engine right at its knock borderline limit continuously.

In view of the above, it is apparent that there exists a need for a system to enable an engine to operate at its knock limit without the occurrence of engine knock or minimal knock.

SUMMARY

In satisfying the above need, as well as overcoming the enumerated drawbacks and other limitations of the related art, the present invention provides a system and method for controlling control knock in an engine having one or more cylinders in which combustion occurs. A sensor detects the ionization of the combustion process in the cylinders. The ionization is related to the knock intensity occurring in the cylinders, and the sensor further transmits a signal associated with the knock intensity. A controller monitors the stochastic behavior of the ionization signal and adjusts the ignition timing of the engine to operate the engine with an actual knock intensity that is below a knock borderline limit that defines a desired knock intensity. The stochastic behavior may include the mean, standard deviation, and the stochastic distribution of the knock intensity signal.

The controller may include one or more feedback loops. For example, an adaptive feedback loop may be employed to adjust the desired knock intensity in response to changing operating conditions. The controller may also include a stochastic feedback loop that maintains the mean value of the knock intensity at a level to ensure that the actual knock intensity does not exceed the desired knock intensity. Additionally, an instant correction feedback loop may be employed to avoid engine knock when the stochastic feedback loop fails to keep the actual knock intensity below the desired knock intensity level.

Further features and advantages of this invention will become readily apparent from the following description and from the claims.

BRIEF DESCRIPTION OF THE DRAWINGS

FIGS. 2A and 2B are plots of the knock intensity signal of an IC engine with substantial knock (FIG. 2B) and with minimal or no (FIG. 2A) knock;

DETAILED DESCRIPTION

Figure 1:
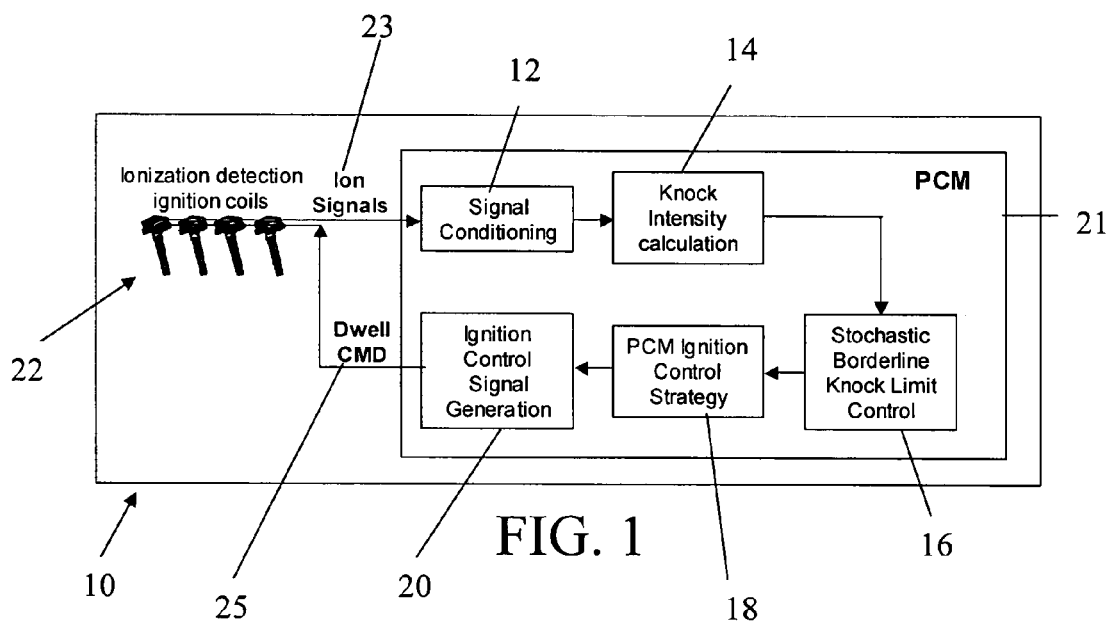
FIG. 1 is a block diagram of a system to control knock in an IC engine in accordance with the invention.

Referring now to FIG. 1, a system embodying the principles of the present invention is illustrated therein and designated at 10. As its primary components, the system 10 includes a signal conditioning module 12, a knock intensity calculation module 14, a stochastic knock control limit module 16, an ignition control strategy module 18, and an ignition control signal general module 20, all associated with a powertrain control module ("PCM") 21, and a set of ionization detection ignition coils 22 associated with respective cylinders.

Each ionization detection ignition coil 22 provides a single ionization output signal 23, and the signals from all the cylinders are fed into the signal conditioning module 12 where the signals are merged into one or two signals with an analog switch that is based upon combustion event information of the current cylinder. These conditioned signals are then relayed to the knock intensity calculation module 14 which includes a knock detection Application Specific Integrated Circuit ("ASIC") that calculates knock intensity based upon the specified knock window. The ASIC further filters the conditioned ionization signal with band pass filters, calculates the absolute value of the filtered signal, integrates the absolute value signal over a specific knock window, and sends this information to the stochastic knock control limit module 16, which determines the knock limit of the engine. The knock limit information is passed to the ignition control strategy module 18 which instructs the ignition control signal generation module 20 to provide a dwell control input command signal 25 to the cylinders.

The use of a high quality in-cylinder ionization signal enables controlling engine knock by using knock intensity information derived from ionization signals associated with the combustion process in each cylinder because of the increased signal to noise ratio, as compared to conventional accelerometer based systems. The cycle-to-cycle variation in the combustion process results in an ionization knock intensity signal that is similar to a random process when the engine is operated at knock conditions. In accordance with the invention, the system 10 implements a stochastic approach for engine knock control utilizing the mean and standard deviation information of the ionization knock intensity signal as well as the evolution of its stochastic distribution. In particular, the stochastic knock limit control module 16 is able to seek and find engine knock borderline ignition timing and also enables the engine to operate at its knock borderline limit continuously with little or no knock.

The aforementioned integrated value of the knock signal over the knock window is referred to as the ionization intensity. FIGS. 2A and 2B show two knock intensity signals for a three-liter V6 engine over an integration window. FIG. 2A shows ten cycles of the knock intensity signal while the engine is not knocking, illustrating a very low knock intensity magnitude, and FIG. 2B shows the same knock intensity signal when the engine is operated at knocking conditions.

From FIG. 2B, it is clear that even though the engine is operated at a fixed operation condition, the knock intensity varies cycle-to-cycle. In fact, the cycle-to-cycle event variation in the combustion process results in an ionization knock intensity signal that is similar to a random process, as mentioned previously.

Figure 3:
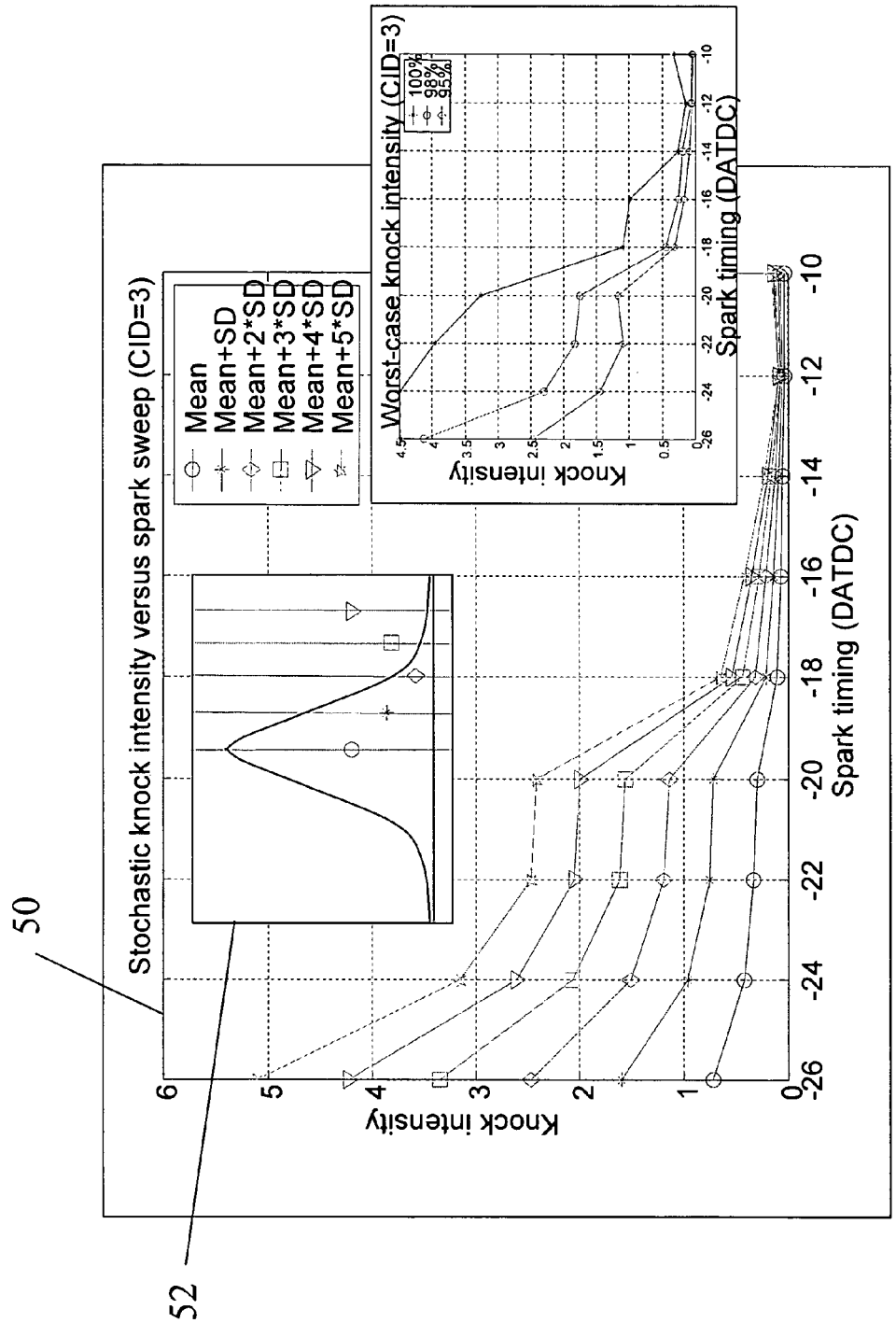
FIG. 3 is a plot of knock intensity as a function of the spark timing.

FIG. 3 shows the stochastic properties of a typical knock intensity signal obtained from a raw ionization signal. The mean knock intensity shown in plot 50 increases as the ignition timing advances, demonstrating good controllability. The system 10 uses not only the raw knock intensity signal but also its stochastic properties (mean, variance, as well as the evolution of its stochastic distribution) illustrated in the plot 52.

Figure 4:
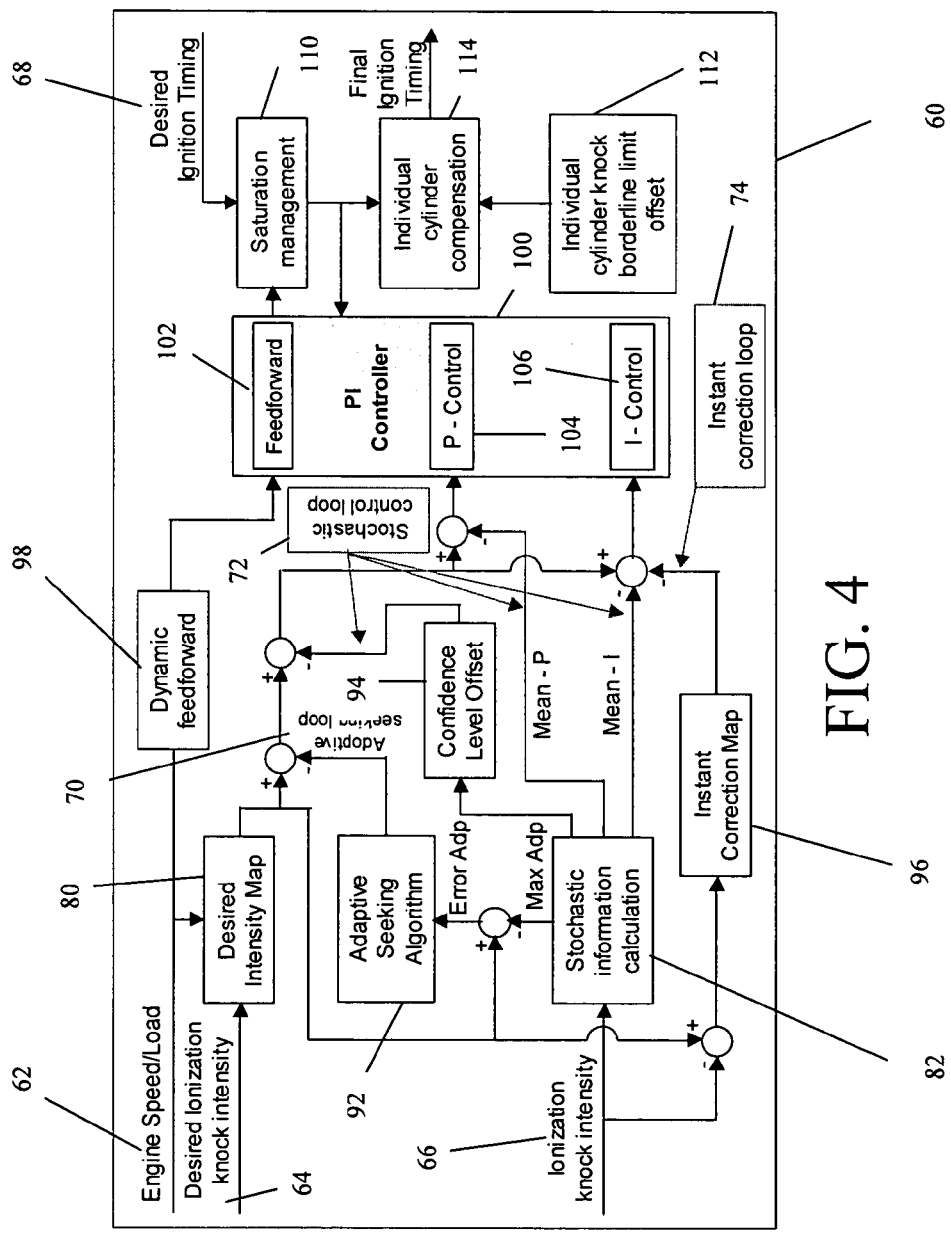
FIG. 4 is a block diagram of a controller of the system of FIG. 1 in accordance with the invention.

Referring also to FIG. 4, there is shown details of a stochastic closed-loop knock borderline limit controller 60 in which the control module 16, the ignition control strategy module 18, and the ignition control signal generation module 20 are implemented. The primary inputs to the controller 60 include:
  a) A engine speed/load input 62 associated with the current engine operational speed and load.
  b) A desired ionization knock intensity 64 which defines the level of the borderline knock limit. Note that the purpose of the closed loop knock borderline control is to keep the actual knock intensity (obtained from the ionization signal 23) below the desired knock intensity. From FIG. 3 it can be seen that the knock borderline ignition timing moves in the advanced direction when the desired knock intensity increases.
  c) An ionization knock intensity input 66 obtained from the knock intensity calculation module 14 through the use of the ASIC.
  d) A desired ignition timing input 68 which is the signal from the ignition control strategy module 18 based upon the engine MBT ("Maximum Brake Torque") ignition timing for the best fuel economy. When the MBT timing is more advanced than the knock borderline timing, the knock borderline controller 60 limits the desired ignition timing to its knock borderline timing.

There are three feedback loops associated with the controller 60, in particular,
  a) An adaptive seeking feedback loop 70 which provides a two-fold purpose: 1) reducing the calibration conservativeness of operating the engine at its "TRUE" knock borderline, and 2) improving robustness of the knock borderline controller 60 when the engine is operating at different environments. This is accomplished by using an error signal between the desired ionization knock intensity 64 and a stochastic criterion, referred to as a distribution maximum value, which is obtained by finding the maximum value of a given distribution (e.g., 90%). For instance, if the given distribution is 90%, 10% of the data is above the calculated maximum value, and the distribution maximum value is the maximal of the remainder of the 90% of the data. The adaptive seeking algorithm 92 described below reduces the desired knock intensity when the distribution maximum value is greater than the knock intensity; otherwise, it increases the desired knock intensity value.
  b) A stochastic feedback loop 72 which keeps the mean of the knock intensity at a certain level so that the actual knock intensity will not exceed the desired knock intensity. The desired mean knock intensity level is obtained by further reducing the desired knock intensity level by an offset value below that calculated by the adaptive seeking feedback loop 70. The calculation of the offset value is either based upon the knock intensity signal variance or its stochastic distribution. When using the knock intensity variance, with a given confidence level (e.g., 93.3% of the knock intensity is below the desired knock intensity), the offset value is based upon the assumed normal distribution function (e.g., for 93.3%, the offset value is three times the variance); and when using the distribution function directly, the offset value is found by locating the given confidence level over the distribution function.
  c) An instant correction feedback loop 74 which serves to avoid engine knock when the stochastic feedback control loop 72 does not keep the knock intensity below the desired knock intensity level. Note that this control feedback loop feeds to an integration portion of a PI controller 100 described below.

The controller 60 also includes the following components:
1) A desired intensity map 80 that includes a lookup table with "engine speed" and "engine load" as inputs. The output of the map 80 is the "desired knock intensity" that is the product of the lookup table output and the desired ionization knock intensity 64. The map 80 compensates for the need of making the desired knock intensity as a function of the engine speed and load 62.
2) A stochastic information calculation block 82 which calculates four key variables used in the three feedback loops 70, 72, and 74, namely
  i) A "distribution max value" defined as the maximum value over a given distribution, where the data is arranged from low to high. For example, if the given distribution is 90 percent, 10 percent of the data will be above the calculated distribution max value, and the distribution max value is the maximal of the remainder of the 90 percent of the data.
  ii) A "long standard deviation" defined as the finite standard deviation based upon the actual ionization knock intensity 66 with a specific data size, where the data length is relatively longer than the shorter data length defined below in iv).
  iii) A "long mean" defined as the calculated mean using the same data length of the long standard deviation.
  iv) A "short mean" defined as the calculated mean using a relatively shorter data length than the longer data length.

3) An adaptive seeking algorithm 92 which utilizes the error between the "desired knock intensity" from the map 80 and the "distribution max value" to generate the adaptive seeking output by integrating the error over the engine combustion event with a given gain. The purpose of the algorithm is to reduce the conservativeness of the stochastic feedback loop 72.

4) A confidence level offset 94 which calculates a confidence offset value to be subtracted from the "desired knock intensity" after it is corrected by the adaptive seeking algorithm 92. The offset value can be determined by: 1) defining the offset value as a given value multiplied by the "long standard deviation"; or 2) making the offset value as a function of the engine speed and load 62.

5) An instant correction map 96 which calculates an instant correction signal to be fed in to the integration portion 106 of the PI controller 100 described below. When the error between the "desired knock intensity" and the actual ionization knock intensity 66 is greater than zero, the output is zero; that is, no correction is required. And when the error is less than zero, the error is fed into a one-dimensional lookup table and the output is set as a negative instant correction signal for the integration portion 106 of the PI controller 100.

6) A dynamic feedforward 98 which includes a two-dimensional lookup table using the engine speed and load 62 as inputs and a dynamic controller using the lookup table output as an input. The lookup table generates an open-loop borderline knock limit signal as a function of engine speed and load 62, and the dynamic controller consists of a first order controller with a time constant that is a function of the engine load rate change. When the rate change is positive (i.e., the load is increasing), the time constant is relatively small since the in-cylinder temperature is lower than the temperature that occurs during steady state operation, and when the rate is negative, the time constant is relatively large since the in-cylinder temperature is higher than the temperature that occurs during steady state operation.

7) A PI controller 100 with three primary components: a) a feedforward control 102; b) a proportional control 104; and c) an integration control 106. The feedforward control 102 takes the output of the dynamic feedforward block 98 as an input and adds it to the output of the PI controller 100. The input to the proportional control 104 is the error between the "long mean" variable of the stochastic information calculation block 82 and the "desired knock intensity". This input is further adjusted by subtracted the offset value obtained from the confidence level offset block 94. The proportional control 104 further multiplies the input with a proportional gain, and adds the result to the PI controller 100 output. Input to the integration control 106 includes both input from the instant correction loop block 74 and the mean error between the "short mean" from the stochastic information calculation block 82 and the "desired knock intensity" from the desired intensity map 80 signal, with the error being further adjusted by subtracting the offset value obtained rom the confidence level offset block 94. Note that using a relative "short mean" error for the integration improves the response time.

8) A saturation management 110 which provides an average ignition-timing signal. If the PI controller 100 output is more advanced than the desired ignition timing 68, the output becomes the desire ignition timing 68; otherwise, the output is the output from the PI controller 100.

9) An individual cylinder knock borderline limit offset 112 which generates an offset vector based upon the ionization knock intensity 66. Since the knock borderline limit is different for each individual cylinder, this block 112 calculates the offset value for each individual cylinder so that the global borderline limit, generated by the PI controller 100, can be corrected afterwards.

10) An individual cylinder compensation 114 which adds the offset value to the average knock borderline limit generated by the PI controller 100.

As a person skilled in the art will readily appreciate, the above description is meant as an illustration of an implementation of the principles this invention. This description is not intended to limit the scope or application of this invention in that the invention is susceptible to modification, variation and change, without departing from spirit of this invention, as defined in the following claims.

What is claimed is:

1. A system to control knock in an engine having one or more cylinders in which combustion occurs, comprising:
    a sensor that detects the ionization of the combustion process in one or more cylinders, the ionization being related to the knock intensity occurring in one or more cylinders, the sensor further transmitting a signal associated with the knock intensity; and
    a controller that monitors the stochastic behavior of the ionization signal and adjusts the ignition timing of the engine to operate the engine with an actual knock intensity that is below a knock borderline limit, the knock borderline limit defining a desired knock intensity.

2. The system of claim 1 wherein the stochastic behavior includes the mean, standard deviation, and the stochastic distribution of the knock intensity signal.

3. The system of claim 1 wherein the controller includes an adaptive feedback loop that adjusts the desired knock intensity in response to changing operating conditions.

4. The system of claim 3 wherein the controller includes a stochastic feedback loop that maintains the mean value of the knock intensity at a level to ensure that the actual knock intensity does not exceed the desired knock intensity.

5. The system of claim 4 wherein the mean knock intensity is obtained by reducing the desired knock intensity by an offset value.

6. The system of claim 5 wherein the offset value is based on the variance of the knock intensity signal.

7. The system of claim 5 wherein the offset value is based on the stochastic distribution of the knock intensity signal.

8. The system of claim 4 wherein the controller includes an instant correction feedback loop to avoid engine knock when the stochastic feedback loop fails to keep the actual knock intensity below the desired knock intensity level.

9. A method to control knock in an engine having one or more cylinders in which combustion occurs comprising:
    detecting the ionization of the combustion process in one or more cylinders, the ionization being related to the knock intensity occurring in one or more cylinders;
    transmitting a signal associated with the knock intensity;
    monitoring the stochastic behavior of the ionization signal; and adjusting the ignition timing of the engine to operate the engine with an actual knock intensity that is below a knock borderline limit, the knock borderline limit defining a desired knock intensity.

10. The method of claim 9 wherein the stochastic behavior includes the mean, standard deviation, and the stochastic distribution of the knock intensity signal.

11. The method of claim 9 further comprising adjusting the desired knock intensity in response to changing operating conditions.

12. The method of claim 11 further comprising maintaining the mean value of the knock intensity at a level to ensure that the actual knock intensity does not exceed the desired knock intensity.

13. The method of claim 12 wherein the mean knock intensity is obtained by reducing the desired knock intensity by an offset value.

14. The method of claim 13 wherein the offset value is based on the variance of the knock intensity signal.

15. The method of claim 13 wherein the offset value is based on the stochastic distribution of the knock intensity signal.

16. The method of claim 12 further comprising avoiding engine knock when the actual knock intensity is not kept below the desired knock intensity level.

* * * * *